United States Patent
Homma et al.

(10) Patent No.: US 7,698,518 B2
(45) Date of Patent: Apr. 13, 2010

(54) DISK ARRAY WITH CAPACITY MANAGEMENT

(75) Inventors: Yukiko Homma, Odawara (JP); Koji Nagata, Kaisei (JP)

(73) Assignee: Hitachi, Ltd., Tokyo (JP)

( * ) Notice: Subject to any disclaimer, the term of this patent is extended or adjusted under 35 U.S.C. 154(b) by 602 days.

(21) Appl. No.: 11/642,927

(22) Filed: Dec. 21, 2006

(65) Prior Publication Data

US 2007/0118703 A1   May 24, 2007

Related U.S. Application Data

(63) Continuation of application No. 10/853,289, filed on May 26, 2004, now Pat. No. 7,174,438.

(30) Foreign Application Priority Data

Apr. 9, 2004   (JP)   ............... 2004-116115

(51) Int. Cl.
  *G06F 13/00* (2006.01)
(52) U.S. Cl. .................. 711/161; 711/171; 714/20
(58) Field of Classification Search ................. 711/161, 711/171; 714/20
  See application file for complete search history.

(56) References Cited

U.S. PATENT DOCUMENTS

| | | | |
|---|---|---|---|
| 5,403,639 A | 4/1995 | Belsan et al. | |
| 6,260,125 B1 | 7/2001 | McDowell | |
| 6,374,266 B1 | 4/2002 | Shnelvar | |
| 6,442,706 B1 | 8/2002 | Wahl et al. | |
| 6,473,775 B1 | 10/2002 | Kusters et al. | |
| 6,584,551 B1 | 6/2003 | Huber | |
| 6,694,413 B1 | 2/2004 | Mimatsu et al. | |
| 2004/0030951 A1 | 2/2004 | Armangau | |
| 2004/0068636 A1 | 4/2004 | Jacobson et al. | |

(Continued)

FOREIGN PATENT DOCUMENTS

EP   1 349 089 A2   3/2003

(Continued)

OTHER PUBLICATIONS

European Search Report dated May 31, 2005.

(Continued)

*Primary Examiner*—Christian P. Chace
*Assistant Examiner*—Jared I Rutz
(74) *Attorney, Agent, or Firm*—Foley & Lardner LLP

(57) ABSTRACT

The usage amount of a pool area is avoided from becoming equal to 100%, thereby preventing all snapshot images from being crashed. There is provided a disk-array apparatus including a control processor. Here, the control processor controls a data reading/writing from/into a first logical volume created using a memory area of plural disk drives, and controls past data such that the past data is written into a second logical volume as differential data on each generation basis, the past data being stored into the first logical volume, and manages the differential data. If the amount of the differential data stored into the second logical volume has exceeded a first predetermined value, the control processor determines a generation of the differential data to be deleted from among the differential data written into the second logical volume. The control processor deletes the differential data of the generation determined.

8 Claims, 11 Drawing Sheets

U.S. PATENT DOCUMENTS

| | | |
|---|---|---|
| 2004/0268067 A1 | 12/2004 | Yamagami |
| 2005/0027819 A1 | 2/2005 | Nakano et al. |

FOREIGN PATENT DOCUMENTS

| | | |
|---|---|---|
| EP | 1 349 089 A3 | 3/2003 |
| JP | 2001306407 | 4/2000 |
| JP | 2002-278819 | 3/2001 |
| JP | 2002-278819 | 9/2002 |
| JP | 2005-050024 | 2/2005 |

OTHER PUBLICATIONS

"SANworks by Compaq Virtual Replicator System Administrator's Guide", Product Version 3.0, Product No. AA-RMJFE-TE, 1st Edition (Jan. 2002), in Japanese, 2 pages, and partial translation into English, 2 pages.

FIG.8

| PRIMARY LU | PAIR STATE | VIRTUAL LU # | snapshot CREATION TIME-AND-DATE |
|---|---|---|---|
| 0 | PSUS | 0 | 20031008083030 |
| 0 | PSUS | 1 | 20031009084040 |
| 0 | PSUS | 2 | 20031010091010 |
| 0 | PSUS | 3 | 20031011084545 |
| 0 | PSUS | 4 | 20031012082020 |
| 0 | PSUS | 5 | 20031013091515 |
| 0 | PSUS | 6 | 20031014090505 |
| 0 | PSUS | 7 | 20030930141420 |
| 0 | PSUS | 8 | 20031007182030 |
| 0 | PSUE | 9 | 20030920101010 |
| 0 | PSUS | 10 | 20031121223030 |
| 0 | PSUS | 11 | 20031122223030 |
| 0 | PSUS | 12 | 20031123223030 |
| 0 | PAIR | 13 | 20031124223030 |

PAIRED-INFORMATION MANAGEMENT TABLE

VIRTUAL-LU DELETION INFORMATION SETTING VIEW

| PERMIT DELETION | PROHIBIT DELETION | DELETION PRIORITY-ORDER |

○ VIRTUAL LU WILL BE DELETED IN ORDER FROM OLDEST TIME-AND-DATE.
◉ SPECIFIED VIRTUAL LU WILL BE DELETED.
PRIMARY LU: [PRIMARY LU #1 ▼]

[OK]  [CONFIRM SET INFORMATION]  [CANCEL]

↓ CONFIRM SET INFORMATION    ↑ OK (b)

VIRTUAL-LU DELETION INFORMATION SETTING VIEW

PLEASE CHECK DELETION-PERMISSIBLE VIRTUAL LUs, AND SET THE DELETION PRIORITY-ORDER.

| DELETION CHECK | VIRTUAL LU # | PRIORITY-ORDER |
|---|---|---|
| ✓ | VIRTUAL LU #0 | HIGH ▼ |
| ✓ | VIRTUAL LU #1 | LOW ▼ |
| ⋮ | ⋮ | ▼ |
| ✓ | VIRTUAL LU #12 | INTERMEDIATE ▼ |
| ☐ | VIRTUAL LU #13 | — ▼ |

[OK]

DISK ARRAY WITH CAPACITY MANAGEMENT

CROSS-REFERENCE TO RELATED APPLICATION

This application is a Continuation application of U.S. application Ser. No. 10/853,289 filed May 26, 2004. Priority is claimed based on U.S. application Ser. No. 10/853,289 filed May 26, 2004, which claims the priority date of Japanese Patent Application No. 2004-116115 filed on Apr. 9, 2004, the content of which is hereby incorporated by reference into this application.

BACKGROUND OF THE INVENTION

The present invention relates to a disk-array apparatus, and more particularly to a differential-LU management technology in a snapshot.

In a computer system, there exists a case of creating the duplication of a storage volume into which original data has been stored, such as a case of backing up data to be stored into the storage apparatus. In this case, a condition becomes necessary that, concerning the storage volume into which the original data has been stored and a storage volume into which the duplicated data is stored, their contents coincide with each other and consistency therebetween is maintained. This condition requires that an updating of the storage volume into which the original data has been stored be stopped until the creation of the duplication has been completed. In versatility systems such as the computer system, however, it is impossible in some cases to stop an access to the storage volume into which the original data has been stored.

In view of this situation, a technology called "snapshot" has been developed, which is as follows: With respect to the storage volume into which the original data has been stored and the storage volume into which the duplicated data is stored, consistency therebetween at a certain point-in-time is maintained. This is performed in order that, even if the original data has been updated after the certain point-in-time, the original data at the certain point-in-time will be able to be referred to.

According to the snapshot technology, if the original data is to be updated after the point-in-time when consistency should be maintained, the data at the point-in-time when consistency should be maintained is stored into another storage volume. Namely, if the original data has been not updated, the original data remains the same and unchanged. Otherwise, if the original data is to be updated, the data at the point-in-time when consistency should be maintained is stored into another storage volume. (Refer to, e.g., JP-A-2001-306407.)

Also, a proposal has been made concerning a method of making the snapshot available in plural generations.

According to this method, a data holding unit 1 performs a normal reading/writing. A data holding unit 2 saves a snapshot image by the data holding unit 1 at a certain point-in-time. A data holding unit 3 saves history information. Here, the history information includes updated data which accompanies a data rewriting into the data holding unit 1 after a point-in-time when the snapshot image has been saved into the data holding unit 2, information for indicating a generation of the updated data, and information for indicating an updating area of the updated data. A data-reading-source selecting unit 4, in accordance with specifications of the generation and the area of a snapshot image to be read, refers to each history information saved in the data holding unit 3, and recognizes and acquires a saving location of the snapshot image to be read, and, depending on the saving location, switches the data reading source to either the data holding unit 2 or the data holding unit 3. (Refer to, e.g., JP-A-2002-278819.)

SUMMARY OF THE INVENTION

The snapshot function exhibits an advantage of being capable of reducing the capacity of a differential LU down to an amount smaller than the capacity of a primary LU. In the snapshot function, however, an increase in the data writing from a host results in an increase in the differential data. Moreover, if the usage amount of the pool area (i.e., the differential LU) becomes equal to 100%, maintaining the snapshot becomes impossible. On account of this, if the usage amount of the pool area has exceeded a threshold value, a warning is issued to the manager. Having received this warning, the manager deals with the warning by performing an operational management, such as saving the data into another disk to reduce the usage amount of the pool area, or deleting a V-VOL. This has imposed so much burden on the manager, eventually causing the manager to take a risk of failing in avoidance of the situation that the usage amount of the pool area becomes equal to 100%.

It is an object of the present invention to avoid the usage amount of the pool area from becoming equal to 100%, and to prevent all the snapshot images from being crashed.

The present invention provides a disk-array apparatus including a high-ranked interface connected to a high-ranked apparatus and receiving data from the high-ranked apparatus, a memory connected to the high-ranked interface and saving data and control information about the data, the data being exchanged with the high-ranked apparatus, plural disk interfaces connected to the memory and controlling the data such that the data is read/written from/into the memory, the data being exchanged with the high-ranked apparatus, plural disk drives connected to the plural disk interfaces and storing therein the data under the control by the plural disk interfaces, the data being transmitted from the high-ranked apparatus, and a control processor for controlling a data reading writing from/into a first logical volume created using a memory area of the plural disk drives, for controlling past data such that the past data is written into a second logical volume as differential data on each generation basis, the past data being stored into the first logical volume, and for providing a snapshot management table in an area of the memory thereby to manage the differential data, the snapshot management table being designed for managing the differential data. Here, if the amount of the differential data stored into the second logical volume has exceeded a first predetermined value, the control processor determines a generation of the differential data which is to be deleted of the differential data written into the second logical volume. Then, the control processor deletes the differential data of the generation determined.

Also, if the amount of the differential data stored into the second logical volume has exceeded a third predetermined value, the control processor determines the first logical volume corresponding to the differential data which is to be deleted of the differential data written into the second logical volume. Then, the control processor deletes the differential data related with the first logical volume determined.

According to the present invention, it becomes possible to avoid the usage amount of the pool area from becoming equal to 100%, and to prevent all the snapshot images from being crashed.

Other objects, features and advantages of the invention will become apparent from the following description of the embodiments of the invention taken in conjunction with the accompanying drawings.

BRIEF DESCRIPTION OF THE DRAWINGS

FIG. 8 is an explanatory diagram of the paired-information management table in an embodiment of the present invention;

FIG. 9 is an explanatory diagram of the setting views of the virtual-LU deletion processing in the embodiment of the present invention;

DESCRIPTION OF THE EMBODIMENT

Figure 1:
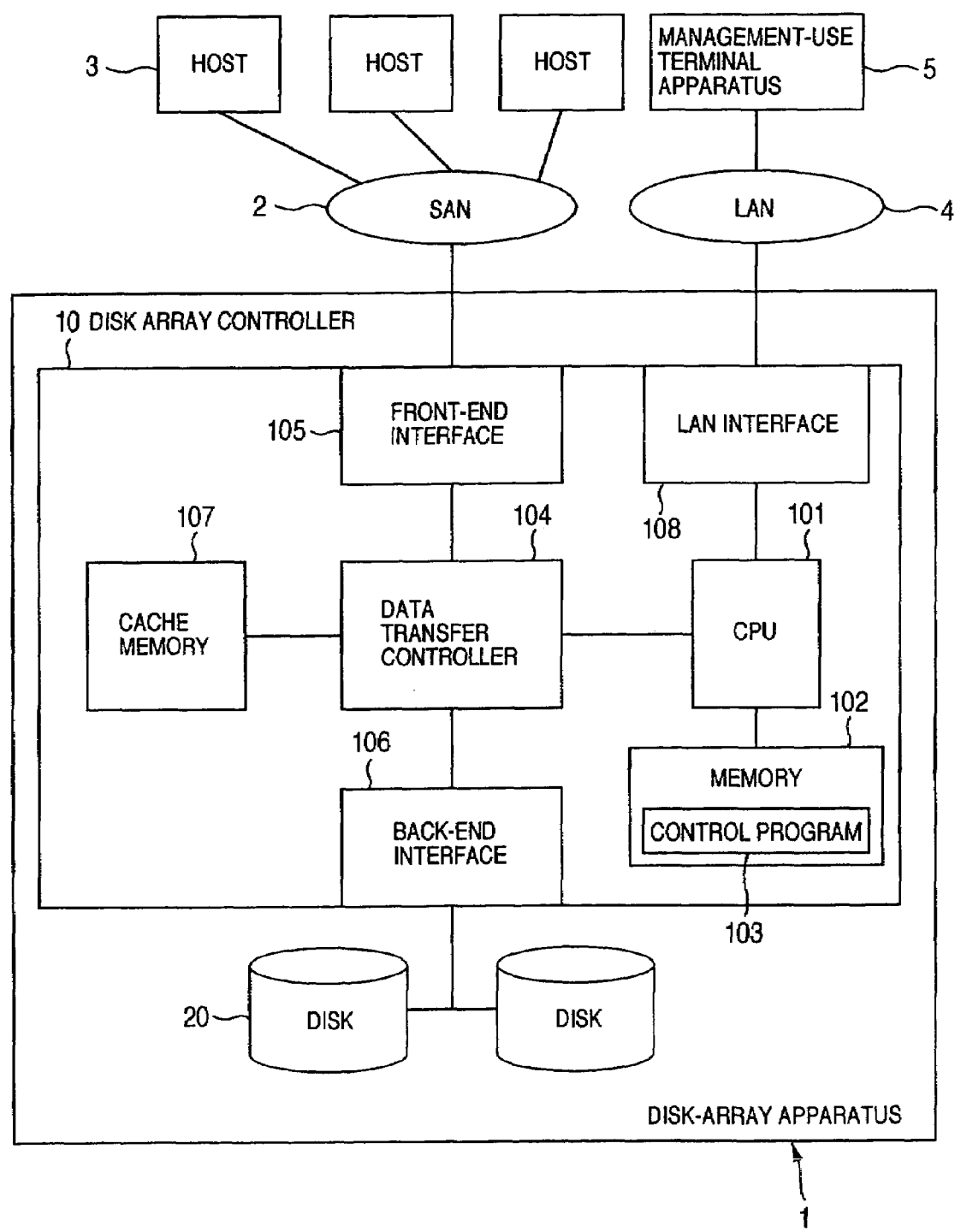
FIG. 1 is a block diagram of a disk-array apparatus in an embodiment of the present invention.

Hereinafter, referring to the drawings, explanation will be given below concerning embodiments of the present invention.

FIG. 1 is a block diagram for illustrating the configuration of a disk-array apparatus in an embodiment of the present invention.

A disk-array apparatus 1 in the embodiment of the present invention includes a disk array controller 10 and disks 20. Also, the disk-array apparatus 1 is connected to plural hosts 3 via a SAN 2, and is connected to a management-use terminal apparatus 5 via a LAN 4.

The disk array controller 10, based on the operation of a control program 103, controls a data input/output into/from the disks 20. Also, the disks 20 configure the RAID (: Redundant Array of Inexpensive Drives), which allows data to be stored to have redundancy. Even if a failure has occurred in part of the disks, this redundancy prevents the stored data from vanishing.

The disk array controller 10 includes a CPU 101, a memory 102, a data transfer controller 104, a front-end interface 105, a back-end interface 106, a cache memory 107, and a LAN interface 108.

The memory 102 stores therein a control program 103. (Refer to FIG. 2.) The CPU 101 calls up and executes the control program 103, thereby performing respective types of processings.

The data transfer controller 104 transfers the data among the CPU 101, the front-end interface 105, the back-end interface 106, and the cache memory 107.

The front-end interface 105, which is an interface designed for the SAN 2, transmits/receives the data and control signals with the hosts 3 by employing, e.g., the Fibre Channel Protocol.

The back-end interface 106, which is an interface designed for the disks 20, transmits/receives the data and control signals with the disks 20 by employing, e.g., the Fibre Channel Protocol.

The cache memory 107 includes therein a cache for temporarily storing the data to be transmitted/received between the front-end interface 105 and the back-end interface 106.

Namely, the data transfer controller 104 transfers, between the interfaces 105 and 106, the data to be read/written from/into these disks 20 via the SAN 2. Moreover, the controller 104 transfers, to the cache memory 107, the data to be read/written from/into these disks 20.

The LAN interface 108, which is an interface designed for the LAN 4, makes it possible to transmit/receive the data and control signals with the management-use terminal apparatus 5 by employing, e.g., the TCP/IP Protocol.

The SAN 2 is a network which allows the communications by employing a protocol suitable for the data transfer, e.g., the Fibre Channel Protocol.

Each host 3 is a computer apparatus which includes a CPU, a memory, a storage apparatus, an interface, an input apparatus, and a display apparatus. Taking advantage of the data provided from the disk-array apparatus 1, each host 3 makes available such services as database services and WEB services.

The LAN 4, which is a network used for managing the disk-array apparatus 1, allows the communications of the data and control signals among the computers by employing, e.g., the TCP/IP Protocol. The network employed as the LAN 4 is, e.g., the Ethernet (: the trade mark, which, hereinafter, will be used just as it is).

The management-use terminal apparatus 5 is a computer apparatus which includes a CPU, a memory, a storage apparatus, an interface, an input apparatus, and a display apparatus. In the management-use terminal apparatus 5, a management program is operating. The management program allows recognition of the operation state of the disk-array apparatus 1, and allows controls over the operation of the disk-array apparatus 1. Incidentally, in the management-use terminal apparatus 5, a client program such as a WEB browser is operating. Accordingly, the operation of the disk-array apparatus 1 may also be controlled by the management program supplied from the disk-array apparatus 1 via the CGI (: Common Gateway Interface) or the like.

Figure 2:
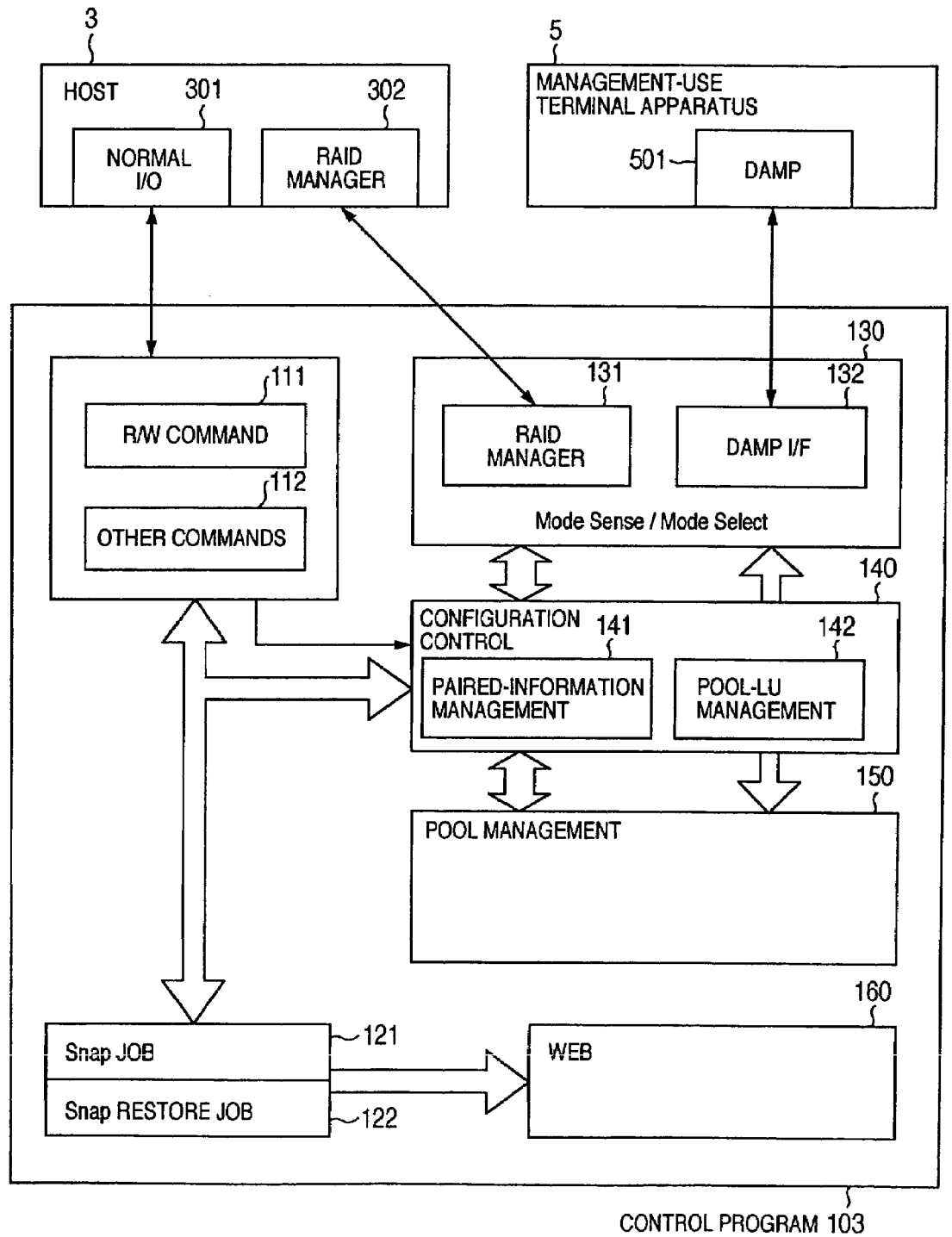
FIG. 2 is an explanatory diagram of the control program in an embodiment of the present invention.

FIG. 2 is an explanatory diagram of the control program 103 in an embodiment of the present invention.

A data input/output request transmitted from a normal-I/O processing program 301 of the host 3 is analyzed by a R/W-command analysis program 111 of the control program 103 in the disk-array apparatus 1. Next, the request analyzed is transmitted to a Snap JOB program 121.

If the Snap JOB program 121 has received the data writing request into a primary LU, the program 121 duplicates, into a differential LU, before-updated data stored within the primary LU. After this duplication, the program 121 updates the contents of the primary LU. Moreover, the program 121 updates a snapshot management table (i.e., a differential-information management block 204) in such a manner that blocks within a virtual LU corresponding to blocks within the primary LU whose data has been updated are caused to correspond to blocks on the differential LU into which the data of the primary LU (i.e., the before-updated data) had been stored at a reception point-in-time of a snapshot creation request.

Also, if a Snap-Restore JOB program 122 has received an access request to the virtual LU, the program 122 refers to the snapshot management table, thereby accessing the blocks of the primary LU or the blocks of the differential LU caused to correspond to the blocks of the virtual LU. In this way, it becomes possible for the disk-array apparatus 1 to provide a snapshot image. Furthermore, the host 3 accesses the virtual LU, using the normal-I/O processing program 301. This access allows the host to take advantage of the information within the primary LU at an issuing point-in-time of the snapshot creation request.

Also, control commands transmitted from the normal-I/O processing program 301 are analyzed by an other-commands analysis program 112, then being transmitted to a configuration-information control program 140.

If a paired-information management program 141 of the configuration-information control program 140 has received the snapshot creation request, at first, the program 141 registers, into the snapshot management table, identification information for identifying a new virtual LU. Next, the program 141 newly registers snapshot pairs into a paired-information management table, thereby ensuring and initializing a differential bitmap 202, a primary-LU address table 203, and the differential-information management block 204. At first, blocks of this virtual LU are caused to correspond to the blocks of the primary LU on a one-to-one correspondence basis by the snapshot management table.

A pool-LU management program 142, as will be described later, manages the addition and deletion of a LU registered into the pool area.

A pool management program 150 manages ensuring of the area of the snapshot differential management table (i.e., the differential-information management block 204), the transitions to released and empty queues, and the like.

A WEB program 160 provides the WEB browser with the state of each snapshot pair created by the snapshot (i.e., presence or absence of a pair's failure judging from information such as the information within the paired-information management table).

A RAID manager program 131 of the control program 103 in the disk-array apparatus 1 is connected to a RAID manager program 302 of the host 3 in a communications-capable manner. The RAID manager programs 131 and 302 allow executions of the operations such as the creation of the snapshots and the modification of the pair states.

Also, a DAMP interface program 132 provides a user interface for performing respective types of disk-array settings such as a virtual-LU deletion processing. The DAMP interface program 132 is connected to a DAMP program 501 of the management-use terminal apparatus 5 in a communications-capable manner. This DAMP interface program 132 permits executions of the communications with the DAMP program 501 of the management-use terminal apparatus 5, thereby permitting executions of the RAID-configuration management of the disk-array apparatus 1, the automatic addition to the pool, and the deletion setting.

Figure 3:
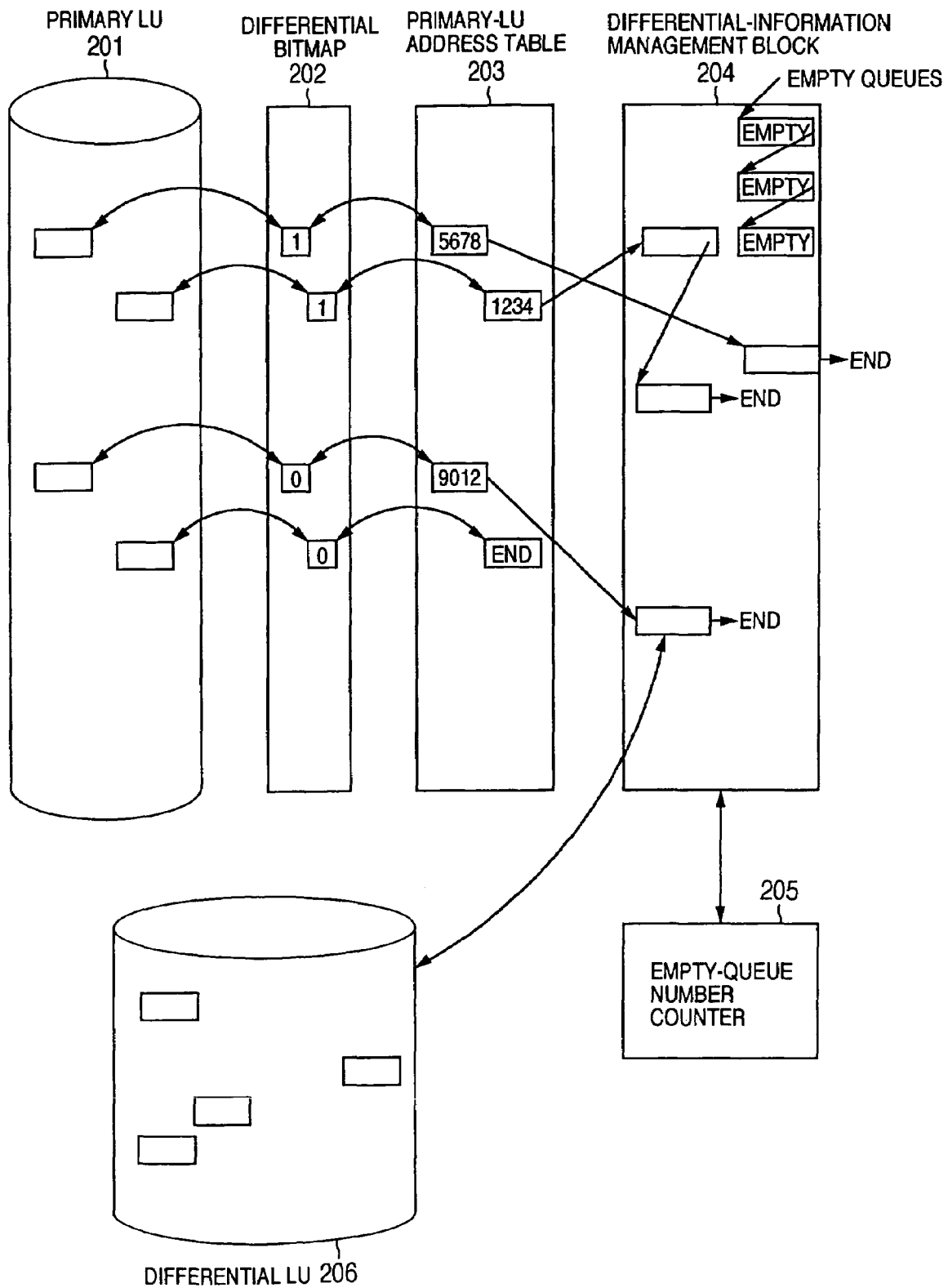
FIG. 3 is an explanatory diagram of the differential-LU management method in an embodiment of the present invention.

FIG. 3 is an explanatory diagram of the snapshot management method in an embodiment of the present invention.

The primary LU 201, which is used for the normal operations, is a logical unit (i.e., P-VOL: Primary Volume) that becomes the target of the data input/output from/to the host 3.

The differential bitmap 202, which is provided in the management area of the cache memory 107, has bits corresponding to each block (e.g., 64 KB/block) of the primary LU 201. This differential bitmap 202 configures the snapshot management table along with the primary-LU address table 203 and the differential-information management block 204 which will be described later.

If the differential data corresponding to a block address of the primary LU 201 has been recorded into the differential LU 206, bits corresponding to the primary LU 201 within the differential bitmap 202 are equal to "1". Accordingly, when performing a writing into the primary LU 201, referring to the differential bitmap 202 makes it possible to judge whether or not there is need of copying the before-updated data into the differential LU (Namely, if the bits are equal to "1", the data at the snapshot creation point-in-time has been already written into the differential LU 206. Consequently, there is no need of copying the data of the primary LU 201 into the differential LU 206).

The primary-LU address table 203, which is provided in the management area of the cache memory 107, records therein addresses of the differential-information management block 204 in a manner corresponding to the bits of the differential bitmap 202.

The differential-information management block 204, which has the same capacity as that of the differential LU 206, is provided in the management area of the cache memory 107. The differential-information management block 204 is separated on each block (e.g., 64 KB/block) basis of the differential LU 206, and includes a management table in each block. This management table records therein information indicating what generation of snapshot data the differential data is, the differential data having been recorded at a position corresponding to each block of the differential LU 206. Also, if there exists another differential data corresponding to the block of the primary LU 201, this management table records therein link information to the address on the differential-information management block 204. Namely, searching for and tracing the address recorded on the differential-information management block 204 makes it possible to refer to the differential data in plural generations.

Incidentally, in the unused area of the differential-information management block 204, links are set as empty queues. Moreover, the number of the empty queues is managed by an empty-queue number counter 205 provided in the cache memory 107.

The differential LU 206 includes the LU registered into the pool area. This differential LU 206 duplicates therein the data of the primary LU 201 at the snapshot creation point-in-time. In addition, referring to a generation management bitmap of the differential-information management block 204 makes it possible to know what generation of differential data the data of the differential LU 206 is.

Accordingly, when writing the data into the primary LU, by referring to the differential bitmap 202, it is judged at first whether or not there is need of copying the before-updated data into the differential LU. Furthermore, if the corresponding bits of the differential bitmap 202 are found to be "1", it is judged that there is no need of copying the before-updated data into the differential LU. Consequently, the data is written into the primary LU. Meanwhile, if the corresponding bits of the differential bitmap 202 are found to be "0", the data is written into the primary LU after the before-updated data has been copied into the differential LU.

Subsequently, the link address for the newly-set differential data is set into the block of the differential-information management block 204 corresponding to the block of the primary LU. Moreover, depending on the requirements, the address of the block of the differential-information management block 204 is set onto the primary-LU address table. Furthermore, the corresponding bits of the differential bitmap 202 are set to be "1". Then, the generation management bitmap of the differential-information management block 204 is set which corresponds to the address of the differential LU 206 into which the before-updated data had been written. In addition, since the empty queues of the differential-information management block 204 have been used, the empty-queue number counter 205 is updated.

Also, when accessing a virtual LU (i.e., V-VOL: Virtual Volume), by referring to the primary-LU address table 203, the address of the differential-information management block 204 is specified based on the block address of the virtual LU which becomes the access target. (This block address is the same as the one of the primary LU.) Then, based on the generation management bitmap of the address of the differential-information management block 204, it is specified whether or not there exists differential data of the access-target generation. Moreover, if there exists the differential data of the desired generation, the differential data is read from the address of the differential LU 206 corresponding to the address of the differential-information management block 204, thereby providing the image of the virtual LU. Meanwhile, if there exists no differential data of the desired generation, link addresses for the other differential data are referred to, thereby searching for the differential data of the desired generation. Furthermore, if whatever differential data has been found to be none of the desired generation, the data recorded in the primary LU at present is provided as the data of the virtual LU.

Figure 4:
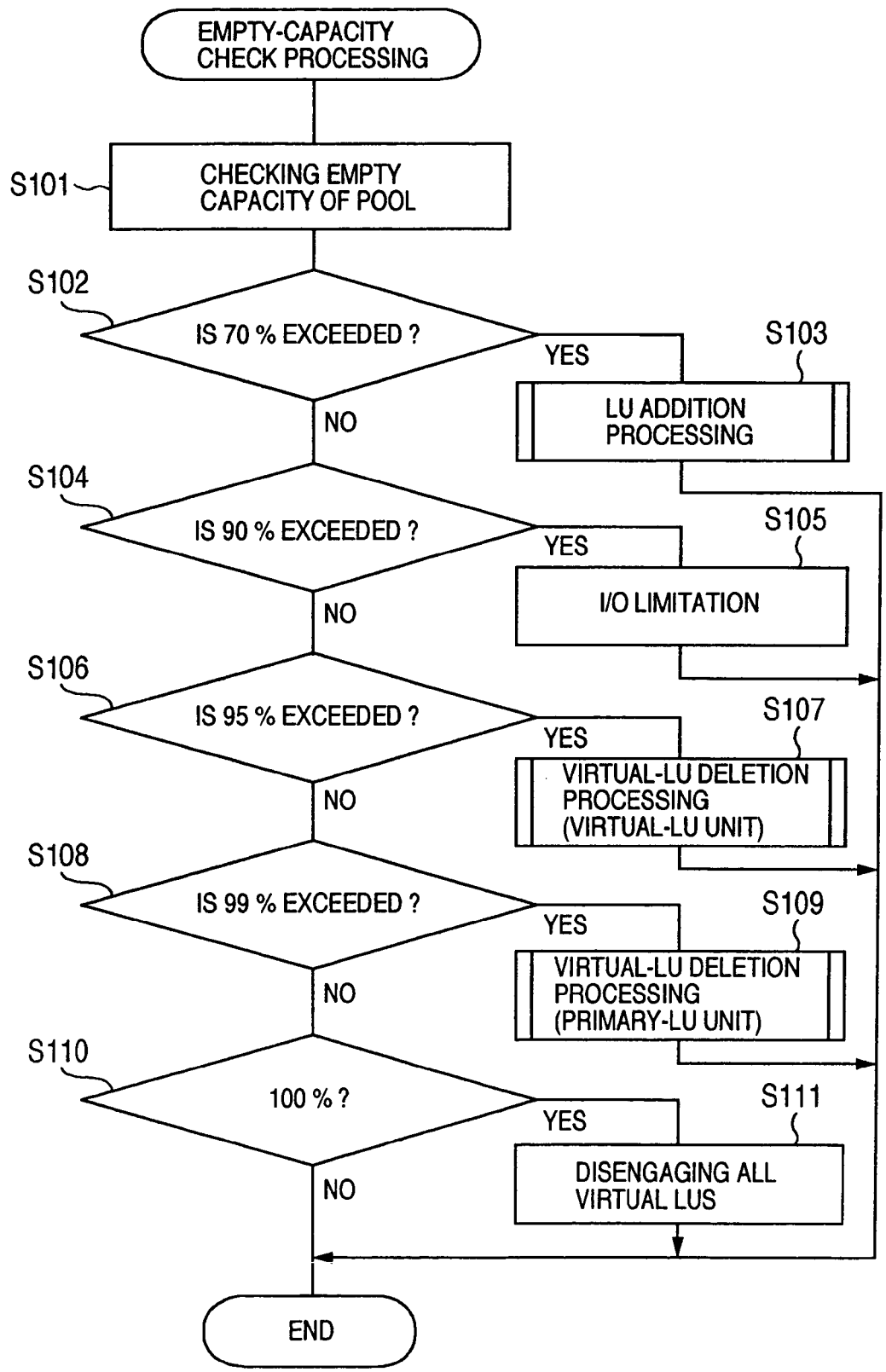
FIG. 4 is a flowchart of the empty-capacity check processing in an embodiment of the present invention.

FIG. 4 is a flowchart of the empty-capacity check processing in an embodiment of the present invention. When copying differential data from a primary LU to a differential LU by a processing such as a data writing processing into the primary LU, the empty-capacity check processing is executed by the pool-LU management program 142.

At first, the empty capacity (which may also be the capacity already used) of the pool area (i.e., the differential LU) is confirmed by referring to the empty-queue number counter 205 (S101).

Next, a comparison is made between the usage amount of the pool area acquired at the step S101 and a predetermined LU addition threshold-value (70%), thereby judging whether or not the usage amount of the pool area has exceeded the LU addition threshold-value (70%) (S102). Moreover, if the usage amount of the pool area has exceeded the LU addition threshold-value (70%), a LU addition processing (FIG. 5) is executed (S103).

It is desirable that this LU addition threshold-value be set to be substantially 70% with enough capacity-allowance left so that the usage amount of the pool area will not have attained to 100%. Nevertheless, depending on the operation state of the storage apparatus (e.g., the number of the data input/output requests), it is possible to modify the LU addition threshold-value.

Also, during the execution of the LU addition processing to the pool area, a threshold value higher than the threshold value at the usual time is set (which is, e.g., 75% with reference to 70% at the usual time). As a consequence, although the LU addition processing is now being executed since the usage amount of the pool area has exceeded the LU addition threshold-value, it becomes possible to prevent the execution of a new LU addition processing.

Next, it is judged whether or not the usage amount of the pool area has exceeded an I/O limitation threshold-value (90%) (S104). As a result, if the usage amount of the pool area has exceeded the I/O limitation threshold-value (90%), the data writing from the host 3 is limited (S105). In this I/O limitation, a priority is given to a hand-operated virtual-LU deletion processing so that the data writing requests and the differential-data deletion processings will be substantially brought into a one-to-one correspondence relationship. This is intended to prevent the usage amount of the pool area from becoming higher than this threshold value.

Next, it is judged whether or not the usage amount of the pool area has exceeded a virtual-LU disengagement threshold-value (95%) (S106). Furthermore, if the usage amount of the pool area has exceeded the virtual-LU disengagement threshold-value (95%), the virtual-LU deletion processing (FIG. 7) is executed (S107). This virtual-LU deletion processing allows a small amount of empty capacity to be created while avoiding a performance degradation in the operational management.

It is necessary that the virtual-LU deletion processing be completed before the usage amount of the pool area has attained to 100%. Accordingly, it is desirable that this virtual-LU disengagement threshold-value be set to be substantially 95% with a little capacity-allowance left. Nevertheless, depending on the operation state of the storage apparatus (e.g., the number of the data input/output requests), it is possible to modify the virtual-LU disengagement threshold-value.

Also, the virtual-LU disengagement threshold-value is set to be 95% in the first judgment, and is set to be a little higher value (which is, e.g., 96%) in the second or thereafter judgments during the execution of the virtual-LU deletion processing. As a consequence, although the virtual-LU deletion processing is now being executed since the usage amount of the pool area has exceeded the virtual-LU disengagement threshold-value, it becomes possible to prevent the execution of a new virtual-LU deletion processing.

Incidentally, if the entire capacity of the pool area is larger than 200 GB, the virtual-LU deletion processing may also be executed when the remaining capacity of the pool area has become smaller than 10 GB (without using the above-described ratios of the usage amount of the pool area).

Next, it is judged whether or not the usage amount of the pool area has exceeded a primary-LU disengagement threshold-value (99%) (S108). This primary-LU disengagement threshold-value allows the following judgments to be made: The possibility that the usage amount of the pool area will have attained to 100% is exceedingly high, and it is required to ensure an empty capacity urgently and securely. Furthermore, if the usage amount of the pool area has exceeded the primary-LU disengagement threshold-value (99%), a virtual-LU deletion processing (FIG. 11) is executed (S109).

Incidentally, if the entire capacity of the pool area is larger than 200 GB, the virtual-LU deletion processing may also be executed when the remaining capacity of the pool area has become smaller than 2 GB (without using the above-described ratios of the usage amount of the pool area).

In this way, the virtual-LU deletions in response to the degree of urgency are executed over the plural steps. This makes it possible to securely prevent the usage amount of the pool area from becoming equal to 100%.

Next, it is judged whether or not the usage amount of the pool area has attained to an all-virtual-LUs disengagement threshold-value (100%) (S110). In addition, if the usage amount of the pool area has attained to 100%, all the states of the virtual LUs using the pool area recorded in the pair-state management table are modified into error states (: PSUE), then deleting all the virtual LUs using the pool area (S111).

In this way, the empty-capacity check processing in the embodiment of the present invention allows the virtual LUs to be automatically deleted in accordance with the specified conditions and without the intervention of the manager. This makes it possible to prevent the usage amount of the pool area from becoming equal to 100%. Also, the check processing allows the virtual LUs to be deleted in the step-by-step manner in correspondence with the usage amount of the pool area. This makes it possible to suppress a performance degradation in the operational management down to the lowest possible degree.

Figure 5:
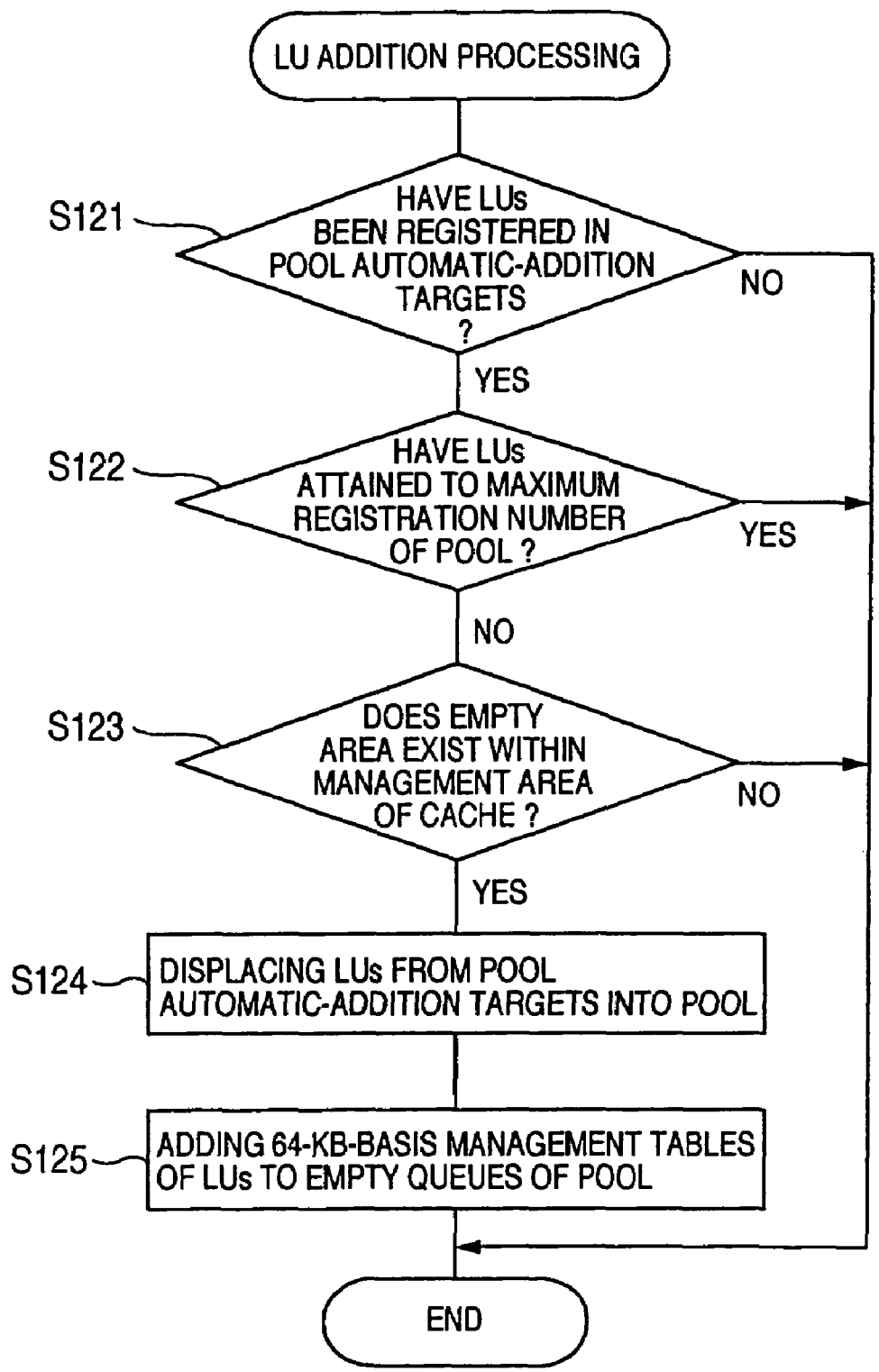
FIG. 5 is a flowchart of the LU addition processing in an embodiment of the present invention.

FIG. 5 is a flowchart of the LU addition processing in an embodiment of the present invention. The LU addition processing is called up from (the step S103 in FIG. 4 of) the empty-capacity check processing (namely, when the usage amount of the pool area has exceeded the LU addition threshold-value (70%)). Theft, the LU addition processing called up is executed by the pool-LU management program 142.

At first, by referring to a pool automatic-addition target management table 143 (FIG. 6), it is judged whether or not LUs have been registered as the pool automatic-addition targets (S121). Moreover, if no LUs have been registered as the pool automatic-addition targets, there exists none of the LUs to be added. Accordingly, this processing is terminated without adding the LUs. Meanwhile, if the LUs have been registered as the pool automatic-addition targets, the processing proceeds to a step S122.

At the step S122, by referring to a pool management table 141 (FIG. 6), it is judged whether or not LUs registered into the pool area have attained to a maximum number. This maximum value of the registration number into the pool area is determined by the capacity of the pool management table 141. Moreover, if the number of the LUs registered into the pool management table 141 has already become equal to the maximum number, it is impossible to newly add the LUs into the pool management table 141. Accordingly, this processing is terminated without adding the LUs. Meanwhile, if the number of the LUs registered into the pool management table 141 has not attained to the maximum number, the processing proceeds to a step S123.

At the step S123, it is judged whether or not an empty capacity exists within the management area of the cache memory 107. This is performed because increasing the capacity of the differential-information management block 204 becomes necessary in accompaniment with the addition of the LUs into the pool area. Furthermore, if no empty capacity exists within the management area of the cache memory 107, it is impossible to increase the area of the differential-information management block 204. Consequently, this processing is terminated without adding the LUs. Meanwhile, if the empty capacity exists within the management area of the cache memory 107, the processing proceeds to a step S124.

If the conditions based on which the LUs are to be added have been confirmed by the processings at S121 to S123, the LUs to be displaced are deleted from the pool automatic-addition target management table 143, then being added into the pool management table 141. This makes the added LUs available as differential LUs (S124).

As these LUs to be displaced, plural LUs can be specified in advance onto the pool management table 141. The arrangement like this makes it possible to add the LUs in a necessary number. For example, assume that ten 100-GB LUs have been registered. Then, if there appears a case that the pool area lacks the capacity of 300 GB, the three 100-GB LUs are added into the pool area. Here, the remaining seven LUs become available for another usage.

After that, the address of an empty queue in the newly-increased area of the differential-information management block 204 is set as the last empty queue of the differential-information management block 204 which has existed from conventionally. This setting connects the newly-increased empty queue to the from-conventionally empty queue (S125).

Figure 6:
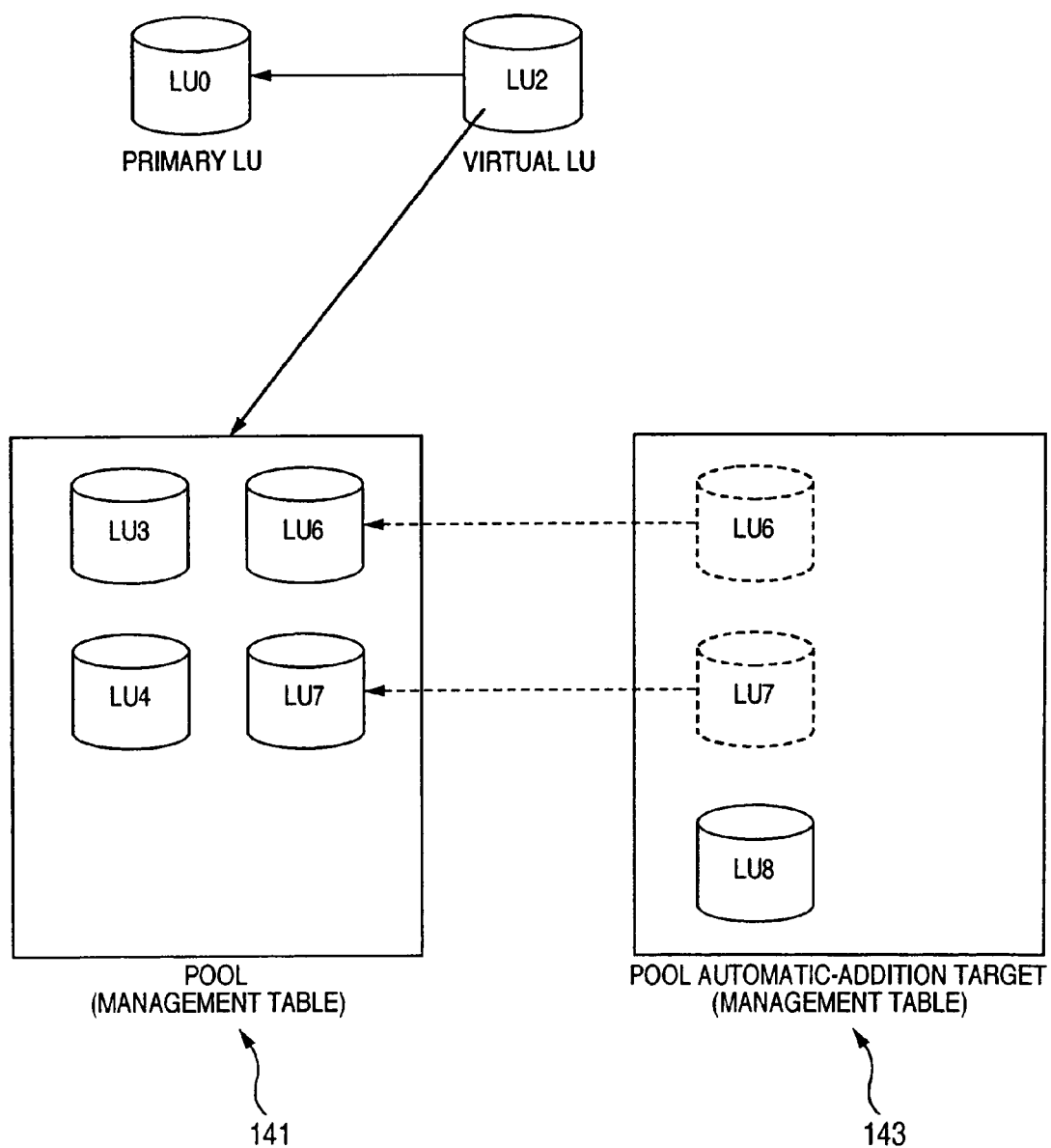
FIG. 6 is an explanatory diagram of the LU addition processing in the embodiment of the present invention.

FIG. 6 is an explanatory diagram of the LU addition processing in the embodiment of the present invention.

With respect to a primary LU (: LU0), a virtual LU (: LU2) is set which is designed for providing the image of data at the snapshot creation point-in-time. This LU2 is a virtual logical unit which includes data of the primary LU and differential data existing in the pool area. Namely, if there occurs an access to the LU2, it is judged whether the data exists in the primary LU, or the data is the differential data existing in the pool area. This judgment allows the implementation of an access to the differential LU.

The LUs to be added into the pool area are dealt with as follows: The LUs (: LU6, LU7) registered into the pool automatic-addition target management table 143 are deleted therefrom, then being added into the pool management table 141. This makes the added LUs available as the differential LUs.

In this way, in the LU addition processing in the embodiment of the present invention, the plural LUs for increasing the capacity of the pool area are prepared in advance. Then, if the usage amount of the pool area has exceeded a certain threshold value, the LUs are added into the pool area automatically. This increases the capacity of the pool area, thereby preventing the usage amount of the pool area from becoming equal to 100%. Also, if the usage amount of the pool area is small and thus there is no need of adding the LUs, the LUs become available for another usage. Consequently, it becomes possible to make effective utilization of the capacity of the disk without registering an unnecessary disk into the pool area.

Figure 7:
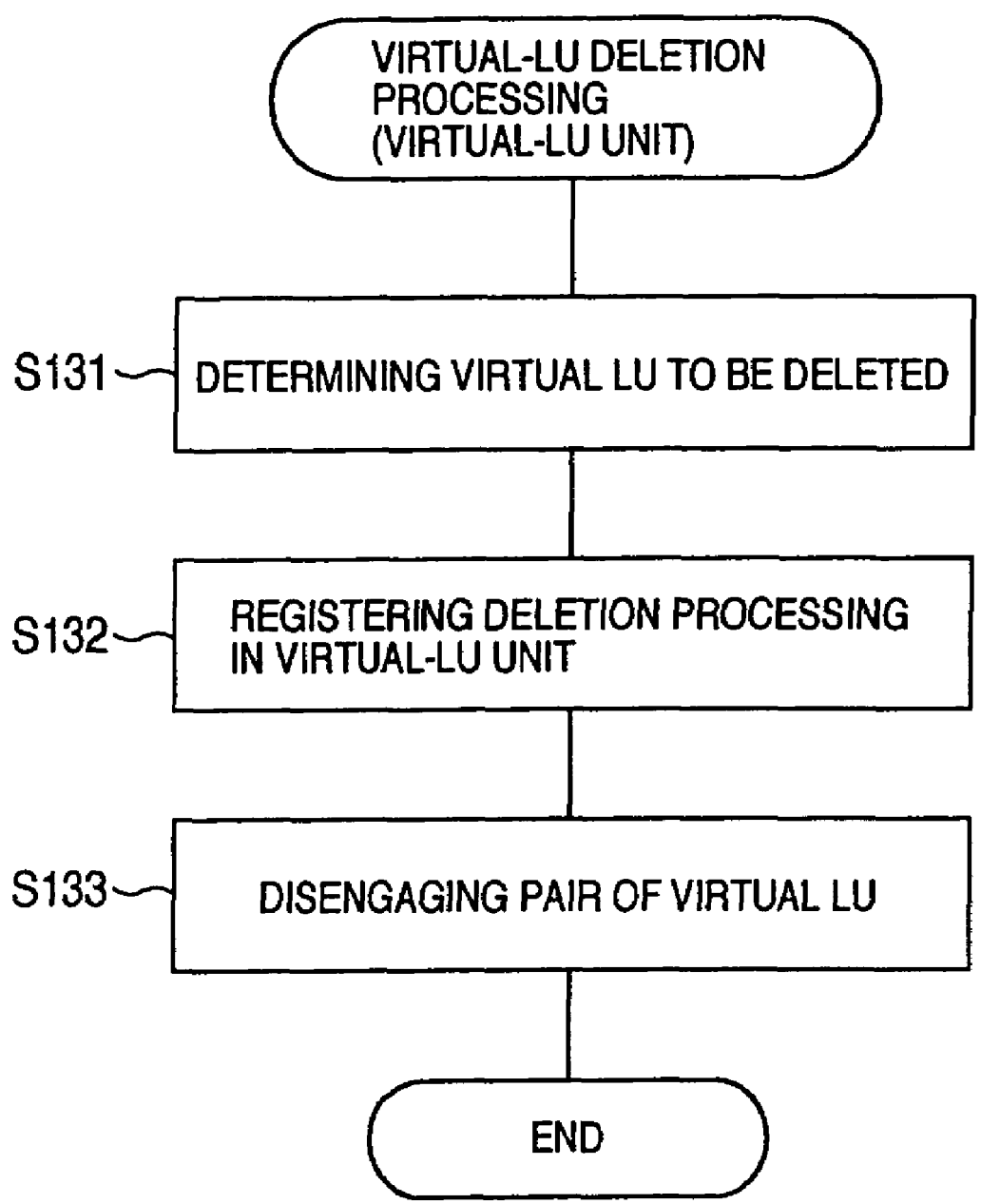
FIG. 7 is a flowchart of the virtual-LU deletion processing in an embodiment of the present invention.

FIG. 7 is a flowchart of the virtual-LU deletion processing (virtual-LU unit) in an embodiment of the present invention. The virtual-LU deletion processing is called up from (the step S107 in FIG. 4 of) the empty-capacity check processing (namely, when the usage amount of the pool area has exceeded the virtual-LU disengagement threshold-value (95%)). Then, the virtual-LU deletion processing called up is executed by the pool-LU management program 142.

Figure 10:
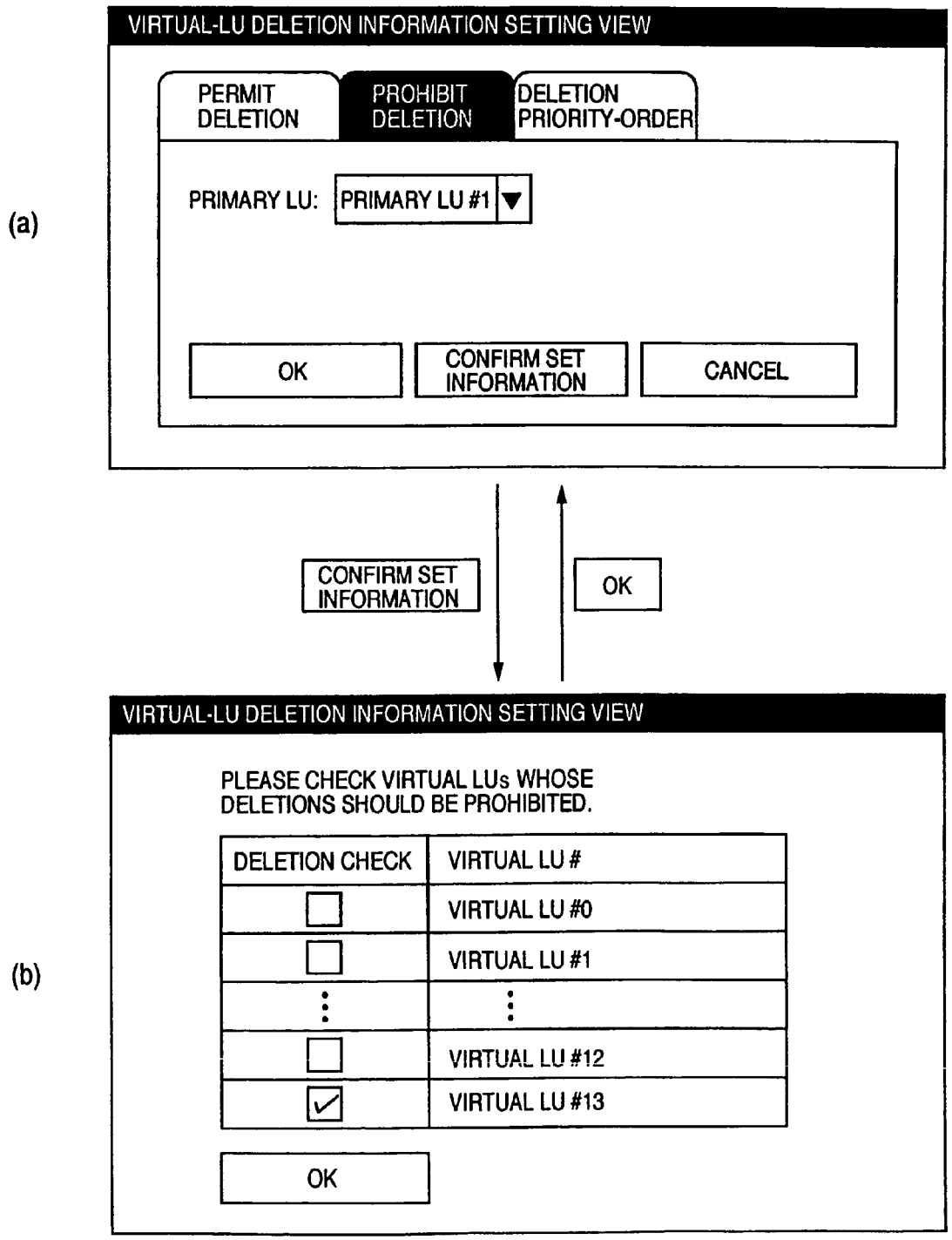
FIG. 10 is an explanatory diagram of the setting views of the virtual-LU deletion processing in an embodiment of the present invention.

At first, based on information that the manager has set, a virtual LU to be deleted is determined (S131). There exist various methods for setting this virtual LU to be deleted. One is a method of deleting the data of a virtual LU belonging to the oldest generation. Also, it is possible to delete the data of a virtual LU belonging to a generation specified by the manager. Incidentally, views on which the manager sets the virtual LU to be deleted will be described later (FIG. 9, FIG. 10).

Also, in order to select the oldest virtual LU, the paired-information management table for all the primary LUs (FIG. 8) is referred to, thereby retrieving pair states of the virtual LUs and the snapshot creation times-and-dates. This retrieval allows the oldest virtual LU to be selected from among the virtual LUs whose pair states have become split states (: PSUS). Since the virtual LU in the pair state (: PAIR) has no real substance, the virtual LU in the split state which has its real substance is selected as the deletion target.

Moreover, the virtual-LU deletion processing in the virtual-LU unit is registered, and then this processing is executed in the background (S132). This deletion processing will delete the data of the determined virtual LU. The differential data are classified into data used in common to plural generations and data used for only a generation of the deletion target. Accordingly, at first, it is necessary to judge which of the two types of data the differential data is. As a result of confirming the generation management bitmap of the differential-information management block 204, if the differential-information management block 204 has been used for only the generation of the target, the data of the differential-information management block 204 is updated, thereby being modified into the empty queue. Meanwhile, if the differential-information management block 204 has been shared by the plural generations, the shared information (i.e., the generation management bitmap) of the differential-information management block 204 is updated.

Furthermore, the pair state of the virtual LU recorded in the paired-information management table (FIG. 8) and becoming the deletion target is modified into an error state (: PSUE) so as to disengage the pair, thereby making this virtual LU unavailable (S133).

The virtual-LU deletion processing explained so far is executed when the usage amount of the pool area has exceeded the virtual-LU disengagement threshold-value (95%). However, if the usage amount of the pool area has not become smaller than the I/O limitation threshold-value (90%) although the virtual LU of the deletion target had been deleted, it is allowable not to perform the deletion of the virtual-LU.

In this way, in the virtual-LU deletion processing (virtual-LU unit), the pair state of the virtual LU of the deletion target (e.g., the oldest virtual LU) is disengaged. This allows the empty capacity to be generated without exerting significant influences on the maintenance of the snapshots. Also, the virtual LU to be deleted is determined based on the information that the manager has set. This allows the empty capacity of the LU to be increased in such a manner that the virtual LUs that should be left are left even if the data therein are old data. Also, the virtual-LU deletion processing is executed in the background. This allows the empty capacity of the data to be generated while avoiding a performance degradation in the operational management.

FIG. 8 is an explanatory diagram of the paired-information management table in an embodiment of the present invention.

The paired-information management table is provided on each primary-LU basis. The paired-information management table records therein the pair states of each primary LU and the virtual LUs of the respective generations, and the creation times-and-dates of the virtual LUs. This recording allows the management of the relationship between each primary LU and the virtual LUs. For example, the 13th virtual LU for the 0th primary LU had been created at 22:30:30 on Nov. 24, 2003, and the pair state (: PAIR) is maintained at present as well. Namely, the 13th virtual LU is the newest virtual LU into which the differential data at present has been written.

Also, the 0th virtual LU for the 0th primary LU had been created at 8:30:30 on Oct. 8, 2003 by the condition that the snapshot creation request had been accepted. At present, the 0th virtual LU is in a split state (: PSUS) where the virtual LU has been created. This virtual LU in the 'split state' becomes a deletion target. Also, the 9th virtual LU for the 0th primary LU had been created at 10:10:10 on Sep. 20, 2003, but is an already-deleted virtual LU. Accordingly, the 9th virtual LU is in an error state (: PSUE) registered as a deletion target.

The paired-information management table allows the checking of virtual LUs of deletion targets, the execution of the deletion registration, and the determination of a virtual LU to be deleted. Incidentally, after the determination of the deletion-target LU, the actual deletion of the differential data is executed by the pool management program 150.

FIG. 9 is an explanatory diagram of the setting views of the virtual-LU deletion processing in the embodiment of the present invention.

FIG. 9 (*a*), which is a virtual-LU deletion information setting main-view, illustrates a state where a "permit deletion" tab has been selected. On this view, concerning the deletion priority-order, a selection is made from either "Virtual LU will be deleted in order from oldest time-and-date." of the creation times-and-dates of the virtual LUs, or "Specified virtual LU will be deleted.". If "Specified virtual LU will be deleted." is selected, a "confirm set information" button becomes active. Moreover, operating the "confirm set information" button transfers the main view to a deletion priority-order setting sub-view (FIG. 9 (*b*)) regarding a selected primary LU. On the deletion priority-order setting sub-view, checking deletion checking fields makes it possible to set the permission of the deletion on each virtual-LU basis. Also, placing checkmarks into the deletion checking fields makes it possible to select the priority-order. Incidentally, instead of using ranks of "high", "intermediate", and "low", the priority-order can also be set in an individual manner.

FIG. 10 is an explanatory diagram of the setting views of the virtual-LU deletion processing in an embodiment of the present invention.

FIG. 10 (*a*), which is a virtual-LU deletion information setting main-view, illustrates a state where a "prohibit deletion" tab has been selected. On this view, a primary LU is selected, and the "confirm set information" button is operated. This transfers the main view to a deletion-prohibition setting sub-view (FIG. 10 (*b*)) regarding the selected primary LU. On the deletion-prohibition setting sub-view, checking the deletion checking fields makes it possible to set the prohibition of the deletion on each virtual-LU basis.

Figure 11:
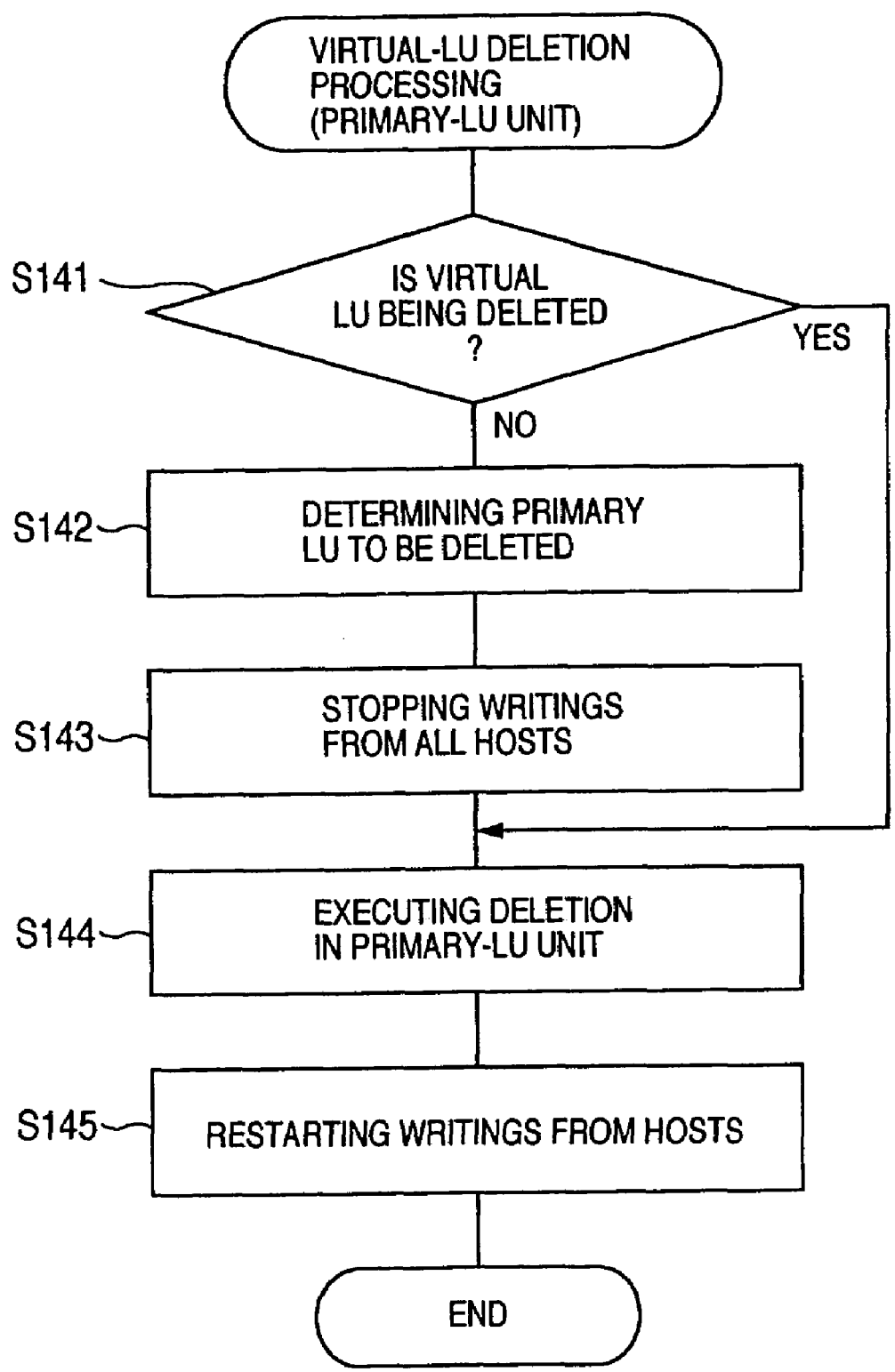
FIG. 11 is a flowchart of the virtual-LU deletion processing in an embodiment of the present invention.

FIG. 11 is a flowchart of the virtual-LU deletion processing (primary-LU unit) in an embodiment of the present invention. The virtual-LU deletion processing is called up from (the step S109 in FIG. 4 of) the empty-capacity check processing (namely, when the usage amount of the pool area has exceeded the primary-LU disengagement threshold-value (99%)). Then, the virtual-LU deletion processing called up is executed by the pool-LU management program 142.

At first, by referring to the paired-information management table, it is judged whether or not the virtual LU is being deleted at present. Namely, if the pair-state field of the paired-information management table has included "PSUS", it is judged that the virtual LU is being deleted (S141). As a result, since it has been found that the virtual LU is being deleted, in order to give a priority to the deletion of the virtual LU and to ensure the empty capacity of the pool area swiftly, the processing transitions to a step S144, then continuing the deletion processing which is being executed at present. Meanwhile, if the virtual LU is not being deleted, the deletion of the virtual LU is newly executed.

Thus, at first, a primary LU corresponding to the deletion of the virtual LU is determined (S142). As this primary LU, it is possible to select a primary LU determined in advance by the manager. In addition thereto, it is also possible to select a primary LU which has received a data writing request from any one of the hosts 3. Here, it is highly likely that the host which has sent the data writing request at present has also become a cause for the decrease in the empty capacity of the pool area. Consequently, selecting the primary LU engaged in the data writing request makes it possible to stop the access from the host.

Moreover, data writings from all the hosts 3 are stopped (S143). This stopping of the data writings allows the deletion processing of the virtual LUs to be executed with a higher priority than those of the other processings, thereby making it possible to ensure the empty capacity swiftly.

Furthermore, the deletion of the virtual LUs is executed which are related with the primary LU selected above (S144). In this deletion processing, by referring to the primary-LU address table 203 of the selected primary LU, the contents registered in the differential-information management block 204 are deleted to modify the data of the differential-information management block 204 of the address into an empty queue. This operation deletes the virtual LUs, thereby ensuring the empty capacity of the pool area. In this deletion processing, in comparison with the earlier-described virtual-LU deletion processing in the virtual-LU unit (i.e., S132 in FIG. 7), there is no necessity for referring to the data (i.e., the generation management bitmap) of the differential-information management block 204 to identify the generations of the virtual LUs. This allows the implementation of the high-speed deletion of the virtual LUs.

In addition, when the empty capacity of the pool area has been ensured, the data writing processings from the hosts 3 are restarted (S145).

In this way, in the virtual-LU deletion processing (primary-LU unit), when the usage amount has exceeded the threshold value, the pair states of all the virtual LUs related with the selected primary LU of the deletion target (e.g., a primary LU to which a data input/output request has been made) are modified into "PSUE", thereby disengaging the pair states. This pair disengagement processing, which is executed in the background, allows the deletion of the large amount of data (i.e., substantially 100 MB) at one JOB. Namely, in order to delete all the virtual LUs related with the selected primary LU, the data writings from all the hosts are stopped temporarily, and then the data are deleted totally (or, on each pre-determined-capacity basis such as 100 MB) in the primary-LU unit. In this way, after having ensured a certain amount of empty capacity of the pool area, the data writing requests from the hosts are restarted. Accordingly, it becomes possible to increase the empty capacity of the pool area promptly and securely. Also, the virtual LUs are deleted with respect to a particular primary LU. Consequently, it becomes possible to stop an access from a particular host related with the particular primary LU.

As representative viewpoints of the present invention other than those disclosed in the appended claims, the following can be presented:

A disk-array apparatus controlling method, the disk-array apparatus including:

a high-ranked interface connected to a high-ranked apparatus and receiving data from the high-ranked apparatus;

a memory connected to the high-ranked interface and saving data and control information about the data, the data being exchanged with the high-ranked apparatus;

plural disk interfaces connected to the memory and controlling the data such that the data is read/written from/into the memory, the data being exchanged with the high-ranked apparatus;

plural disk drives connected to the plural disk interfaces and storing therein the data under control by the plural disk interfaces, the data being transmitted from the high-ranked apparatus; and a control processor for controlling a data reading/writing from/into a first logical volume created using a memory area of the plural disk drives, for controlling past data such that the past data is written into a second logical volume as differential data on each generation basis, the past data being stored into the first logical volume, and for providing a snapshot management table in an area of the memory thereby to manage the differential data on each generation basis, the snapshot management table being designed for managing the relation about the differential data stored into the second logical volume, wherein:

the control processor manages an amount of the differential data stored into the second logical volume, and increases a capacity of the second logical volume if the amount of the differential data stored into the second logical volume has exceeded a first proportion of the capacity of the second logical volume, and limits data writing into the first logical volume if the amount of the differential data stored into the second logical volume has exceeded a second proportion of the capacity of the second logical volume, and, of the differential data written into the second logical volume, deletes the differential data of a particular generation if the amount of the differential data stored into the second logical volume has exceeded a third proportion of the capacity of the second logical volume, and, of the differential data written into the second logical volume, deletes the differential data corresponding to the first logical volume if the amount of the differential data stored into the second logical volume has exceeded a fourth proportion of the capacity of the second logical volume, and, deletes all of the differential data written into the second logical volume if the amount of the differential data stored into the second logical volume has exceeded a fifth proportion of the capacity of the second logical volume.

The disk-array apparatus controlling method, wherein, further, the control processor determines the differential data of the oldest generation as the deletion target.

The disk-array apparatus controlling method, wherein, further, in the first judgment, the control processor judges whether or not the amount of the differential data stored into the second logical volume has exceeded the first predetermined value, and, in the second or thereafter judgment during the differential-data deletion processing, using a second predetermined value larger than the first predetermined value, the control processor judges whether or not the amount of the differential data stored into the second logical volume has exceeded the second predetermined value.

The disk-array apparatus controlling method, wherein further, before determining the first logical volume corresponding to the differential data which is to be deleted, the control processor judges whether or not the differential data is in the deletion processing, and, if the differential data is in the deletion processing, the control processor executes the deletion processing with a priority, the deletion processing being in execution at present.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A disk-array apparatus operatively coupled to a host computer, comprising:

a primary volume for storing data;

a pool volume for storing differential data, said data from said primary volume and said differential data being stored so as to define a virtual volume to be accessed by the host computer;

a control processor for controlling data reading/writing into and from said primary volume and said pool volume, said control processor being configured to control a data storage capacity of said pool volume, wherein when an amount of differential data stored in said pool volume equals or exceeds a first predetermined threshold value, additional storage capacity is added to said pool volume, wherein said control processor is configured such that when the amount of differential data stored in said pool volume equals or exceeds a second predetermined threshold value, writing/deleting of differential data is selectively limited in said virtual volume, said second predetermined threshold value being higher than said first predetermined value, said control processor is configured such that when the amount of differential data stored in said pool volume equals or exceeds a third predetermined threshold value, deleting of differential data is selectively controlled in said virtual volume, said third predetermined threshold value being higher than said second predetermined value, and said control processor is configured such that when the amount of differential data stored in said pool volume equals or exceeds a fourth predetermined threshold value, deleting of data is selectively controlled in said primary volume, said fourth predetermined threshold value being higher than said third predetermined value.

2. A disk array apparatus according to claim 1, wherein said control processor determines the differential data of an oldest generation as a deletion target.

3. A disk array apparatus according to claim 2, wherein the data to be deleted corresponds to data of the primary volume which receives a data write request from the host computer.

4. A disk array apparatus according to claim 1, further comprising a cache memory operatively connected to the control processor.

5. A method for operating a disk-array apparatus operatively coupled to a host computer, the disk-array apparatus having a primary volume, a pool volume, and a control processor, said method comprising the steps of:

storing data in said primary volume;

storing differential data in said pool volume;

defining a virtual volume to be accessed by the host computer based on said data stored in said primary volume and said differential data in said pool volume;

controlling data reading/writing into and from said primary volume and said pool volume via said control processor so as to control a data storage capacity of said pool volume, wherein said step of controlling data reading/writing includes adding storage capacity to said pool volume when an amount of differential data stored in said pool volume equals or exceeds a first predetermined threshold value, said step of controlling data reading/writing includes selectively limiting writing/deleting of differential data in said virtual volume when the amount of differential data stored in said pool volume equals or exceeds a second predetermined threshold value, said second predetermined threshold value being higher than said first predetermined value, said step of controlling data reading/writing includes selectively deleting differential data in said virtual volume when the amount of differential data stored in said pool volume equals or exceeds a third predetermined threshold value, said third predetermined threshold value being higher than said second predetermined value, and said step of controlling data reading/writing includes selectively deleting data in said primary volume when the amount of differential data stored in said pool volume equals or exceeds a fourth predetermined threshold value, said fourth predetermined threshold value being higher than said third predetermined value.

6. A method according to claim 5, wherein said step of selectively deleting differential data includes determining the differential data of an oldest generation as a deletion target.

7. A method according to claim 6, wherein said step of selectively deleting data includes determining the data of the primary volume which receives a data write request from the host computer.

8. A method according to claim 5, wherein a cache memory is operatively connected to the control processor for temporarily storing data.

* * * * *